United States Patent [19]

Maier

[11] 3,725,252

[45] Apr. 3, 1973

[54] DESULFURIZATION WITH SUBSEQUENT H$_2$S ABSORPTION

[75] Inventor: William H. Maier, Rosemont, Ill.

[73] Assignee: Universal Oil Products Company, Des Plaines, Ill.

[22] Filed: July 27, 1970

[21] Appl. No.: 58,375

[52] U.S. Cl. ................208/213, 208/209, 208/212
[51] Int. Cl. .............................................C10g 23/02
[58] Field of Search.........208/209, 213, 216; 23/2 A, 23/3 LA, 210, 212

[56] References Cited

UNITED STATES PATENTS

| | | | |
|---|---|---|---|
| 2,608,521 | 8/1952 | Hoog | 208/213 |
| 2,840,513 | 6/1958 | Nathan | 208/209 |
| 3,471,398 | 10/1969 | Borst | 208/209 |
| 3,483,118 | 12/1969 | Gleim et al. | 208/209 |
| 3,480,417 | 11/1969 | Setzer | 208/209 |

OTHER PUBLICATIONS

Dingman et al., "Hydrocarbon Processing", Vol. 47, No. 7, 138-140, July 1968.

Primary Examiner—Delbert E. Gantz
Assistant Examiner—S. Berger
Attorney—James R. Hoatson, Jr. and Glen P. Winton

[57] ABSTRACT

Process for removal of a selected constituent from a vapor stream which comprises contacting the vapor stream in a high pressure absorption zone with a first stream of lean absorbent, mixing the resulting rich absorbent with a second stream of lean absorbent in a low pressure contacting zone, and separating the resulting mixture in a separation zone under conditions sufficient to provide selected constituent and separated lean absorbent. In a preferred embodiment, the separation zone comprises a phase separator and a low pressure absorption zone, the resulting mixture is passed from the low pressure contacting zone into the phase separator, and a resulting vapor stream is passed from the phase separator into the low pressure absorber wherein it is contacted with a third lean absorbent stream. The process has particular utility in the removal of selected constituent, such as an acid gas or mixture of acid gases, in a high pressure absorption zone maintained at a pressure in excess of 1,000 psig. Particular application is in the removal of hydrogen sulfide from a hydrogenation reaction zone, such as a hydrotreating zone or a hydrocracking zone, wherein a hydrocarbon charge stock containing organic sulfur compounds is desulfurized.

12 Claims, 1 Drawing Figure

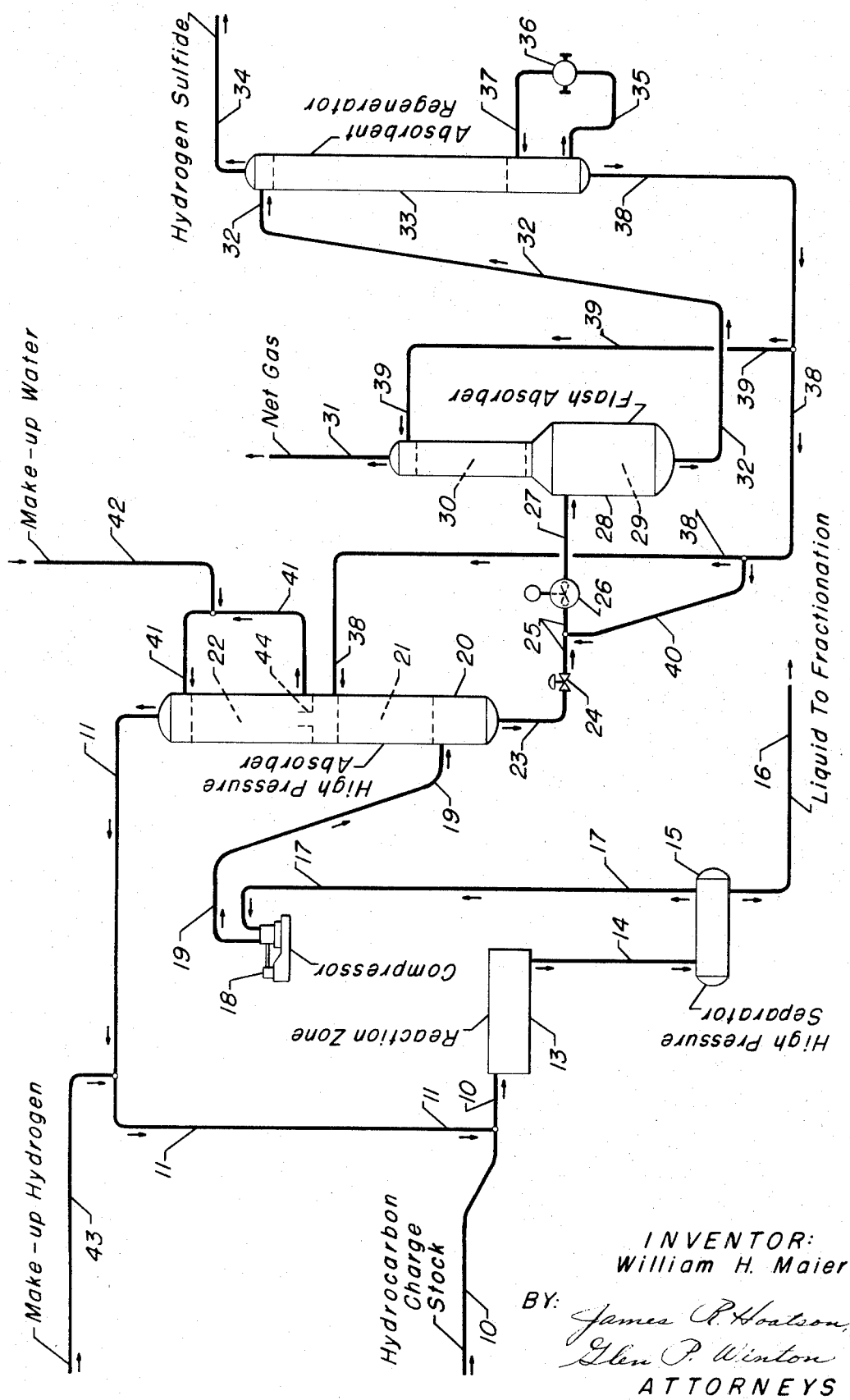

DESULFURIZATION WITH SUBSEQUENT H₂S ABSORPTION

BACKGROUND OF THE INVENTION

The present invention relates to an absorption process, and particularly to a high pressure absorption process for removal of a selected constituent from a vapor stream. The present invention more particularly relates to a process for removal of an acid gas, such as hydrogen sulfide or carbon dioxide, from a vapor stream by contacting the vapor stream with a lean absorbent selective for the acid gas, in an absorption zone maintained at a pressure in excess of 1,000 psig. The present invention specifically relates to an absorption process for the removal of hydrogen sulfide from a hydrogen-rich recycle gas stream passing into a hydrogenation reaction zone, such as a hydrotreating zone or a hydrocracking zone, wherein a hydrocarbon charge stock containing organic sulfur compounds is desulfurized in the presence of hydrogen and a hydrogenation catalyst.

The absorption process of the present invention finds particular application and utility in a hydrocarbon conversion process which may be classified as a hydrogen consuming process in which processing techniques dictate the recycle of hydrogen-rich gaseous phase and, in many instances, the recycle of at least a portion of the normally liquid fraction of the reaction zone effluent.

Such hydrogen consuming processes include the hydrotreating processes wherein gasoline or naptha fractions, kerosine fractions, middle-distillate fractions, light and heavy vacuum gas oils, light and heavy cycle stocks, etc. are treated with hydrogen for the primary purpose of reducing the concentration of various chemical contaminants contained therein.

Another typical hydrogen consuming hydrocarbon conversion process is known in the petroleum refining art as hydrocracking, which may be defined more particularly as the destructive hydrogenation of petroleum. Basically, hydrocracking techniques are utilized to convert relatively heavy hydrocarbonaceous material into lower boiling hydrocarbon products such as gasoline, fuel oil, light cycle oils, etc. In other instances the desired end result of hydrocracking is the production of liquefied petroleum gas.

Relatively recent developments in the area of petroleum technology have indicated that the hydrotreating reactions and the hydrocracking reactions can also be applied successfully to residual stocks, or so called "black oils". Typical examples of hydrocarbons classified as black oils are atmospheric tower bottoms products, vacuum tower bottoms (vacuum residuum), crude oil residuum, topped crude oils, crude oils extracted from tar sands, etc.

Hydrogen treatment of contaminated hydrocarbon charge stocks is well-known in the art of hydrocarbon processing, and a typical method is shown in U.S. Pat. No. 2,878,180. Hydrogen treatment, or hydrotreating, saturates the olefinic constituents of the stock and removes sulfur, nitrogen, chlorine, and other inorganic contaminants by hydrogenation. Hydrotreating also serves to remove trace quantities of arsenic, lead, copper, nickel, vanadium, tungsten, and other metals which may be present in untreated hydrocarbon fractions and which may be detrimental in subsequent processing operations or in final product use. The purification is effected by passing the hydrocarbon charge in admixture with hydrogen into the presence of a suitable catalyst at a pressure of from about 100 psig. to about 1,500 psig. or even higher, the operating pressure being dependent upon the composition or type of charge stock being processed. The hydrogen not only serves as a reactant in effecting the purification of the hydrocarbons but it also affords a method for protecting the catalyst against excessive carbonization by providing a thermal sink for the exothermic heat of reaction. Hydrogen is, therefore, normally present at a concentration of from about 100 standard cubic feet per barrel (SCFB) of hydrocarbon charge to about 3,000 SCFB, or even higher, the amount again being dependent upon the type of charge stock being processed. The temperature of the hydrogen treating zone is maintained in the range from about 350°F. to about 900°F. The actual temperature required will necessarily vary in accordance with the degree of contamination, the type of stock being processed, and with the activity level of the catalyst. The hydrocarbon is normally processed at a liquid hourly space velocity in the range of from about 0.5 to about 10.0. A suitable catalyst for such hydrogen treating of hydrocarbons comprises alumina, silica, and a Group VIII metal or a Group VIB metal or any combination of metals thereof. The metals of Groups VIB and VIII are intended to include those indicated in the *Periodic Chart of the Elements*, Fisher Scientific Co., 1953. A preferred hydrotreating catalyst is comprised of alumina, silica, nickel, molybdenum, and cobalt wherein the metals may be specifically present as the oxides or sulfides.

As previously noted hereinabove, hydrocracking is also commonly referred to as destructive hydrogenation and is thereby distinguished from hydrotreating. In hydrotreating there is simple addition of hydrogen to unsaturated bonds between the carbon atoms and simple substitution of hydrogen for inorganic atoms bonded to the carbon atoms. Hydrocracking effects a more definite charge in the molecular structure of the hydrocarbons being processed, however, in that it breaks carbon-to-carbon bonds in the molecules of the hydrocarbon charge to produce lower boiling products. Hydrocracking processes are most commonly employed for the conversion of various hydrocarbon products boiling above the gasoline or naptha boiling range, for the primary purpose of producing substantial yields of lower boiling saturated products. Although many hydrocracking reactions may be conducted on a thermal basis, the preferred processing technique involves utilization of a catalytic composite possessing a very high degree of hydrocracking activity. In virtually all hydrocracking processes, whether thermal or catalytic, controlled or selective cracking is highly desirable from the standpoint of producing increasing yields of liquid products boiling within the desired boiling ranges.

Selective hydrocracking is of particular importance when processing hydrocarbons and mixtures of hydrocarbons which boil at temperatures above the gasoline and the middle-distillate boiling range, that is, hydrocarbons and mixtures of hydrocarbons having a boiling range indicating an initial boiling point greater than 400°F. and an end boiling point as high as 1,000°F. or more. Recent developments in hydrocracking technology have now indicated that the hydrocracking of residual oils or black oils having substantial quantities of hydrocarbonaceous material boiling at about 1,200°F. or more may be undertaken. Selective hydrocracking of such hydrocarbon fractions results in greater yields of hydrocarbons boiling within the gasoline and middle-distillate boiling range, that is, hydrocarbons boiling below a temperature of 650°F. to 700°F. The practice of the present invention has particularly significant application to the selective hydrocracking of such heavy hydrocarbon stocks.

The hydrocracking of hydrocarbon charge stocks not only provides cracking of high molecular weight materials but it also saturates olefinic constituents of the stock and removes sulfur, nitrogen, chlorine, and other inorganic contaminants by hydrogenation. The hydrocracking reaction thus, also serves to remove trace quantities of arsenic, lead, copper, nickel, vanadium, tungsten, and other metals which may be present in the hydrocarbon fractions.

The hydrocracking reaction is effected by passing the hydrocarbon charge in admixture with hydrogen in the presence of a suitable catalyst at a pressure of from about 100 psig. to about 3,000 psig. or more, the operating pressure being dependent upon the composition or type of charge-stock being processed and the catalyst being utilized. The hydrogen not only serves as reactant in effecting the cracking and the purification of the hydrocarbon, but again affords a method for protecting the catalyst against excessive carbonization. Hydrogen is, therefore, normally present at a concentration from about 100 SCFB of hydrocarbon charge to about 20,000 SCFB, the amount again being dependent upon the type of charge-stock being processed. The temperature of the hydrocracking reaction zone is maintained in the range of about 500° to 1,000°F. or more. The actual temperature required will necessarily vary in accordance with the degree of contamination of the stock, the boiling range of the stock, the activity level of the catalyst, and the type of ultimate products which it is desired to produce. The hydrocarbon is normally processed at a liquid hourly space velocity in the range of from about 0.5 to about 10. A typical catalyst for such hydrocracking of hydrocarbons comprises alumina, silica, and Group VIII metal or a Group VIB metal or any combination of metals thereof.

DESCRIPTION OF PRIOR ART

As known by those skilled in the art, the effluent mixture from the typical hydrotreating or hydrocracking reaction zone hereinabove described, will leave the reaction zone at elevated temperature and elevated pressure and will contain normally gaseous contaminants, typically comprising hydrogen sulfide, ammonia, and hydrogen chloride. Upon subsequent cooling in an effluent exchanger these contaminants may deposit in the exchanger and cause reduced heat transfer rates and excessive pressure drop. The major constituents of such deposits are ammonium chloride and ammonium polysulfides, and it is, therefore, common in the prior art to inject steam condensate into the effluent mixture ahead of the exchanger in order to afford a method of washing such deposits out of the exchanger. The condensate injection rate is preferably equivalent to at least 3 vol.% of the total liquid hydrocarbon which is charged to the reaction zone. This rate not only provides more than a sufficient quantity of water to dissolve the hydrocarbon insoluble constituents, but it particularly assures that there will be intimate mixing of the hydrocarbon and water to assure that the water soluble salts will readily pass into solution. In addition, the turbulence provided by the resulting aqueous phase assists in washing out any other surface deposits.

The cooled effluent then passes, typically, into a high pressure separator wherein a hydrogen-containing vapor phase, a liquid hydrocarbon phase, and an aqueous phase are separated substantially at the pressure of the reaction system. The aqueous phase containing the dissolved inorganic contaminants is discarded.

The liquid hydrocarbon phase is withdrawn from the high pressure separator and typically sent to a low pressure separator which is maintained normally at a pressure in the range of from 100 psig. to 200 psig. A substantial amount of dissolved gaseous vapor, comprising hydrogen and normally gaseous contaminants such as hydrogen sulfide, is released from the hydrocarbon liquid due to the pressure reduction of the low pressure separator and is recovered for use as a fuel or for further processing. The hydrocarbon phase is then withdrawn and introduced into a fractionation zone in order to remove the substantial amount of gas which still remains dissolved therein due to the elevated pressure of the low pressure separator, and in order to effect the desired specifications on the treated or cracked hydrocarbon product or products. In those processes wherein a high boiling hydrocarbon fraction, such as a gas oil or a black oil, have been hydrotreated or hydrocracked, it often is desirable to return a high boiling fraction from the fractionation zone to the initial reaction zone for further processing.

The hydrogen-containing vapor phase is withdrawn from the high pressure separator, and while a part may be discharged from the system as a vent gas stream, it is more typical to recycle this stream back to the reaction zone in its entirety. This hydrogen-rich gas stream contains light hydrocarbon vapor, and is substantially free of ammonia and hydrogen chloride since these contaminants are dissolved in the aqueous phase which is withdrawn from the high pressure separator. However, the hydrogen-containing vapor stream normally contains a substantial amount of hydrogen sulfide, since only a minor portion of the hydrogen sulfide is withdrawn from the high pressure separator in solution within the aqueous phase or within the liquid hydrocarbon phase.

In many hydrotreating and hydrocracking processes, it is desirable, if not indeed necessary, to remove at least a greater portion of the hydrogen sulfide from the recycle gas stream before it is returned to the reaction zone. This is done not merely for the purpose of recovering sulfur as a valuable by-product, but more particularly for the purpose of enhancing the desulfurization reaction which occurs within the reaction zone. The hydrogenation catalysts utilized are not only selective for desulfurizing the hydrocarbon charge stock, but they are also sensitive to the level of sulfur within the reaction zone. Accordingly, hydrogen sulfide is removed from the recycle gas so that the catalytic equilibrium within the reaction zone may be shifted to give a better degree of desulfurization at the same reaction severity, or to give the same degree of desulfurization at a lower reaction severity, thereby enhancing catalyst life.

Removal of hydrogen sulfide from the hydrogen-rich recycle gas stream may be accomplished by any of the well known prior art methods. Typically, however, removal is accomplished by utilizing an acid gas treating system, such as amine absorption, wherein the recycle gas is contacted with an aqueous amine solution in an absorber column under high pressure.

The amine process for the removal of acid gases, such as hydrogen sulfide and carbon dioxide, is one of the most widely used methods for treating a gas stream. Where no carbonyl sulfide is present, monoethanolamine (MEA) solutions are usually employed. If carbonyl sulfide is present in the gas, diethanolamine (DEA) is utilized to remove the hydrogen sulfide since MEA will react with the carbonyl sulfide to form stable compounds.

The amine treating process is based upon the fact that aliphatic alkanolamines will react with acid gases at substantially atmospheric temperatures and that the acid gases will be released from the amine solution at slightly higher temperatures. Absorption of hydrogen sulfide normally occurs at 100°F. or lower, while carbon dioxide may be absorbed in the amine solution at 120°F. or lower, but in some commercial applications higher temperatures are experienced. The resulting rich amine absorbent contains a reaction product comprising chemically combined acid gas and amine, which upon heating will regenerate the amine solution by the reversal of the chemical reaction, thereby releasing the acid gas from solution. The heating of the rich amine solution to a temperature of about 240°F. will cause the release of hydrogen sulfide from the solution while heating to a temperature of about 300°F. will cause the release of carbon dioxide from the amine solution. The heating of the rich amine solution to release the acid gas component and thereby regenerate the lean amine absorbent, is normally accomplished by passing the rich amine solution into a distillation column operated at substantially atmospheric pressure.

The amine treating process normally utilizes a lean absorbent which comprises an aqueous solution of amine. The choice of amine concentration may be arbitrary and is usually made on the basis of corrosion and operating experience. Concentrations of 15 to 20 wt. % are typical for MEA solutions, although occasionally concentrations as low as 10 percent or as high as 30 percent are used. It is generally accepted that the use of lower amine concentrations results in less corrosion of steel equipment. More particularly, due to the corrosiveness of the rich absorbent solution which is withdrawn from the amine absorption tower, it is typical in the art to limit the concentration of hydrogen sulfide contained therein to about 0.35 moles of $H_2S$ per mole of MEA in the rich absorbent.

It is typical in the hydrotreating and hydrocracking art to pass the hydrogen rich recycle gas stream directly into the amine treating absorber without substantial depressurization. The vast quantities of hydrogen-rich gas which must be circulated within the reaction zone generates a high utility expense at the recycle compressor. Clearly then, it is not economical to depressure the gas stream and pass it into a low pressure absorber, for to do so would require additional operating expense in recompressing the gas back up to the reaction zone pressure. However, although passing the reaction zone recycle gas through the absorber at substantially the reaction zone pressure results in a utility saving at the recycle gas compressor, other expenses are involved in operating the treating system in this manner. In particular, the lean MEA solution must be pumped from the absorbent regenerator column which is operated at substantially atmospheric pressure, into a high pressure absorber column and, therefore, an increased expense for circulating the lean amine solution is encountered. Furthermore, operating the absorption tower at the extremely high pressure levels which are typical in such hydrogenation reaction systems creates a large capital expense for this processing vessel and its auxiliary equipment. In particular, in those hydrogenation processes wherein the pressure levels approach or even exceed 2,000 psig., the equipment expense encountered at the absorption column may in fact be excessive.

Accordingly, therefore, it is desirable to provide a method for reducing the hydrogen sulfide concentration of the recycle hydrogen stream of a high pressure hydrogenation reaction zone in a more economical manner.

SUMMARY OF THE INVENTION

Therefore, it is an object of the present invention to provide an improved method for removing a selected constituent from a gas stream maintained at a high pressure.

It is another object of the present invention to provide an improved method for removing an acid gas or a mixture of acid gases from a gas stream maintained at a pressure in excess of 1,000 psig.

It is a further object of the present invention to provide an improved absorption process for the removal of hydrogen sulfide from a hydrogen-rich recycle gas stream into a hydrogenation reaction zone, such as a hydrotreating zone or a hydrocracking zone, wherein a hydrocarbon charge stock containing organic sulfur compounds is desulfurized in the presence of hydrogen and hydrogenation catalyst.

These and other objects of the present invention, as well as the advantages thereof, will become readily apparent to those skilled in the art from the discussion which follows hereinafter in light of the accompanying drawing, which comprises a simplified schematic diagram setting forth one embodiment of the present invention.

It is well known to those skilled in the art of absorption, that as the pressure level within the absorption system is increased, the amount of lean absorbent required to remove a specifically desired amount of selected constituents from a vapor stream is reduced below what is otherwise required for a low pressure absorption system. However, upon the withdrawal of the resulting rich absorbent solution from the high pressure absorber to a low pressure system, a substantial portion of the dissolved selected constituent may be flashed out of the rich absorbent solution and into a distinct vapor phase due to the pressure reduction.

Accordingly, within the practice of the present invention, the selected constituent is removed from the vapor stream by contacting the vapor stream in the high pressure absorption zone with a first portion of lean absorbent solution in an amount sufficient to dissolve therein the desired amount of selected constituent. The resulting rich absorbent solution is then withdrawn from the high pressure absorption zone and contacted with a second portion of lean absorbent liquid in a low pressure contacting zone which is maintained under conditions of liquid-liquid contacting which are sufficient to provide that a minimum of vapor loss of the selected constituent can occur. In a preferred embodiment of the present invention, wherein hydrogen sulfide is removed from a recycle hydrogen stream under high pressure, the second portion of lean absorbent solution (typically monoethanolamine) is added to the rich absorbent solution in an amount which is sufficient to provide that the mole ratio of hydrogen sulfide to amine will be maintained below the corrosive limit of 0.35 moles per mole, as mentioned previously hereinabove.

In summary, therefore, the present invention may be broadly characterized as a process for the removal of selected constituent from a first vapor stream containing said selected constituent, which comprises, (a) contacting said first vapor stream in a high pressure absorption zone, with a hereinafter specified first stream of lean absorbent selective for said selected constituent; (b) removing from said absorption zone, a second vapor comprising first vapor having reduced concentration of selected constituent; (c) withdrawing from said absorption zone, a first rich absorbent containing selected constituent; (d) mixing said first rich absorbent with a hereinafter specified second stream of said lean absorbent, in a low pressure contacting zone under conditions sufficient to provide a reduced mole ratio of selected constituent to absorbent in the resulting second rich absorbent stream, (e) passing the resulting second rich absorbent stream into a separation zone maintained under conditions sufficient to provide a stream comprising selected constituent and a stream comprising separated lean absorbent; (f) passing a first portion of said separated lean absorbent into said high pressure absorption zone as said specified first stream of lean absorbent; and, (g) passing a second portion of said separated lean absorbent into said low pressure contacting zone as said specified second stream of lean absorbent.

More particularly, the present invention may be characterized as the process of the broad embodiment noted hereinabove, wherein the high pressure absorption zone is maintained at a pressure of at least 1,000 psig. and wherein the selected constituent comprises an acid gas or a mixture of acid gases, such as hydrogen sulfide and carbon dioxide.

These broad embodiments and other more preferred embodiments of the present invention may now be more clearly understood by referring to the accompanying drawing in conjunction with the following disclosure of one specific example wherein the present invention is practiced.

DRAWING AND EXAMPLE

In a specific operating example, illustrating a commercial application of the inventive process, an atmospheric reduced crude having a gravity of 16.6° API was processed through a hydrogenation reaction zone at a rate of 40,000 barrels per stream day under hydrogenation conditions sufficient to desulfurize and denitrogenate the reduced crude stock. The charge stock contained 3.8 wt. % of sulfur and had a total nitrogen content of 2,100 ppm. The initial boiling point of the atmospheric reduced crude was 510°F., the 50 percent boiling point was 925°F., and the end boiling point was in excess of 1,200°F.

Referring now to the attached drawing, the atmospheric reduced crude entered the process of the present invention via line 10 at the rate of 40,000 barrels per stream day. A hydrogen rich vapor stream was passed into line 10 via line 11. This mixture of liquid hydrocarbon and hydrogen-rich vapor was then passed via line 10 into a reaction zone 13 which contained a hydrogenation catalyst suitable for the desulfurization and the denitrogenation of the reduced crude oil. The reaction zone was maintained at a pressure of 2,075 psig. and at a catalyst temperature of about 750°F. The resulting desulfurized and denitrogenated crude oil was withdrawn from the reaction zone 13 via line 14 and passed into a high pressure separator 15. The high pressure separator 15 was maintained at a pressure of about 2,000 psig. and at a temperature of about 120°F. The liquid and vapor phases were separated within the separator 15 and a net liquid fraction was withdrawn via line 16 and passed therefrom into a fractionation zone, not shown.

A hydrogen-rich vapor stream was withdrawn from separator 15 via line 17, and passed into a recycle gas compressor 18. The recycle gas compressor 18 increased the pressure of the hydrogen-rich vapor to a level of 2,250 psig. and the work of compression resulted in an increase in temperature of the hydrogen-rich vapor phase to a discharge temperature of 146°F. The recycle vapor stream was discharged from compressor 18 via line 19, and passed via line 19 into an absorption tower 20 maintained at high pressure. This hydrogen-rich recycle gas stream contained 80.3 mole percent of hydrogen, and it was passed into vessel 20 at a rate of 24,843.50 moles per hour. (As used herein, the term "moles per hour" refers to pound moles per hour.) This hydrogen-rich vapor stream contained 503.39 moles per hour of $H_2S$, 4,380.91 mols./hr. of hydrocarbon vapor, and 20.95 mols. /hr. of water vapor. In order to protect the hydrogenation catalyst contained within the reaction zone 13, it was required to reduce the hydrogen sulfide content of this hydrogen-rich vapor stream by removal of at least 90 percent of the $H_2S$ contained therein.

Referring now to the high pressure absorber vessel 20, the vessel contained two absorption zones as illustrated in the drawing. The lower absorption zone 21 comprised an amine absorption zone maintained under high pressure. The upper absorption zone 22 comprised a water-wash absorption zone maintained under high pressure, which was provided in order to remove any entrained amine solution from the recycle hydrogen stream being discharged from the vessel 20 via line 11.

The hydrogen-rich vapor stream passed into the high pressure absorber 20 via line 19 at a locus below the amine absorption zone 21. The vapor stream was contacted with down-flowing rich amine absorbent solution passing from zone 21 into a lower settling zone at the bottom of absorber vessel 20, wherein the rich amine solution was collected below absorption zone 21 at a temperature of 149°F. and a pressure of 2,233 psig. As the hydrogen-rich vapor stream passed upward through the amine absorption zone 21, a first portion of lean monoethanolamine solution was passed into the high pressure absorber 20 via line 38 at a locus above the absorption zone 21, as shown in the drawing. This first portion of the lean amine solution entered absorber 20 at a rate of 14,288.97 mols./hr. The lean MEA solution entering the vessel via line 38 contained 50.84 mols./hr. of $H_2S$ chemically complexed with MEA, and this lean amine solution was an aqueous solution of monoethanolamine comprising 20 wt. % of MEA in water. The lean amine solution entered the high pressure absorber 20 at a temperature of 100° F., and in flowing downwardly through the absorption zone 21, the amine reacted with the greater portion of the hydrogen sulfide contained within the upflowing hydrogen-rich vapor stream. A resulting rich amine solution was withdrawn from the bottom of the high pressure absorber 20 via line 23 and processed in a manner which shall be disclosed hereinafter.

The hydrogen-rich vapor stream passed upwardly from the amine absorption zone 21 and through a liquid trap-out tray 44, which was contained below the water-wash absorption zone 22. As the hydrogen-rich vapor stream passed upwardly through zone 22, it was contacted with down-flowing water under conditions sufficient to remove all amine solution which had been entrained in the vapor phase as it passed upwardly from zone 21 through the liquid trap-out tray 44. The resulting aqueous solution of MEA was collected on tray 44, but a minor portion overflowed from the tray 44, and thereby passed into the amine absorption zone 21. The major portion of the aqueous phase was withdrawn from the liquid trap-out tray 44 via line 41. This aqueous stream was augmented by a stream of make-up water entering line 41 via line 42 at a rate of 18.63 mols./hr. and at a temperature of 110°F. The make-up water was added in an amount sufficient to provide for loss of water vapor into the hydrogen-rich vapor stream passing out of vessel 20 via line 11, and also to provide for the amount of water which overflowed from tray 44 and passed into the amine absorption zone 21. The combined aqueous stream was circulated in line 41 and passed into the top of the high pressure absorber 20 above the water-wash absorption zone 22. The circulation rate within line 41 was maintained at a rate sufficient to keep the liquid-vapor contacting trays, not shown, fully loaded water in zone 22.

A net hydrogen-rich vapor stream was withdrawn from the top of the high pressure absorber 20 via line 11 at a rate of 24,338.36 mols/hr., at a temperature of 147°F., and at a pressure of 2,231 psig. This hydrogen-rich vapor stream had been enriched to a purity of 81.7 mole percent hydrogen due to the removal of 90 percent of the hydrogen sulfide which had been contained in the original vapor passing into the absorber column 20 via line 19. The hydrogen-rich vapor stream contained 50.34 mols/hr. of $H_2S$ and 37.72 mols./hr. of water vapor. The hydrogen-rich vapor stream of line 11 was augmented by a make-up hydrogen stream entering line 11 via line 43, and the resulting hydrogen-rich mixture was passed into line 10 for additional processing within the hydrorefining reaction zone 13 in the manner which was disclosed hereinabove.

Referring now to the bottom of the high pressure absorber 20, a first rich MEA absorbent liquid was withdrawn from vessel 20 via line 23 at a rate of 14,812.74 mols/hr., at a temperature of 149°F., and at a pressure of 2,233 psig. This rich aqueous amine solution contained 503.89 mols./hr. of hydrogen sulfide, 27.87 mols./hr. of dissolved hydrogen, and 40.99 mols./hr. of dissolved low boiling hydrocarbon constituents having from one to about four carbon atoms per molecule. The first rich MEA absorbent solution passed through a back pressure control valve 24 and into line 25. In passing through valve 24, the rich absorbent solution was reduced in pressure from 2,233 psig. to a pressure of 105 psig. This pressure reduction of the first absorbent solution caused a temperature drop to 130°F. from the original temperature of 149°F., since a substantial amount of vapor flashed out of the liquid phase in passing through valve 24.

The flashed rich MEA absorbent liquid and the flash vapor was thereafter combined with a second lean MEA absorbent solution entering line 25 via line 40 at a rate of 9,525.99 mols./hr. and at a temperature of 100°F. The second lean MEA solution contained 33.90 mols./hr. of chemically combined $H_2S$, but sufficient free amine was present to dissolve any $H_2S$ out of the vapor phase and reduce the mole ratio of $H_2S$ to MEA to a value below the corrosive limit of 0.35 mols./mol. The mixture of second lean amine solution, flash vapor was passed into an inline mixing device 26 via line 25. Inline mixer 26 provided a liquid-liquid contacting zone of high turbulence which discharged via line 27, a mixture of flash vapor and a second rich absorbent solution comprising a homogenous solution of the flashed rich absorbent solution of line 23 and the second lean absorbent solution of line 40.

The second rich absorbent solution was thereafter passed via line 27 with the flash vapor phase into a flash absorber 28 at a rate of 24,338.73 mols./hr. The mixture of second rich absorbent solution and flash vapor comprised 537.79 mols/hr. of hydrogen sulfide, 27.87 mols./hr. of hydrogen, and 40.99 mols./hr. of low boiling hydrocarbon constituents. The second rich absorbent solution entered a lower section 29 contained in flash absorber 28 which comprised a phase separation zone maintained at a pressure of 70 psig. and a temperature of 129°F. The second rich absorbent solution was separated from the flash vapor in the separation zone 29.

The flashed vapor phase passed upwardly from separation zone 29 into an upper section of flash absorber 28 which comprised a low pressure absorption zone 30, wherein the flashed vapor was contacted with a third lean MEA solution which entered the flash absorber 28 at a point above the low pressure absorption zone 30 via line 39 at a rate 118.93 mols./hr. This third lean MEA solution entered the vessel at a temperature of 100°F. and it contained 0.42 mols./hr. of dissolved hydrogen sulfide. A net flash vapor was withdrawn from the top of the flash absorber 28 via line 31 as a net gas product. This net gas product of line 31 was substantially free of hydrogen sulfide and was passed into a fuel gas system at a rate of 70.72 mols./hr., at a temperature of 108°F., and at a pressure of 68 psig. The net gas stream contained 27.87 mols./hr. of hydrogen, 40.99 mols./hr. of low boiling hydrocarbon predominating in hydrocarbon having from one to four carbon atoms per molecule, and 1.86 mols./hr. of water vapor.

A third rich absorbent solution was withdrawn from the bottom of flash absorber 28 via line 32 at a rate of 24,386.94 mols./hr., at a temperature of 129°F., and at a pressure of 70 psig. This rich MEA solution contained 538.21 mols./hr. of hydrogen sulfide and a trace amount of hydrocarbon dissolved in the liquid. The third rich absorbent solution was passed via line 32 into an absorbent regenerator column 33. The regenerator column 33 was maintained with a top temperature of 218°F. and a top pressure of 9 psig., and it was operated under conditions sufficient to strip a maximum amount of hydrogen sulfide out of the amine solution by decomposing the chemical complex of $H_2S$ and MEA. In order to accomplish this result, the regenerator column 33 contained a typical reboiler circuit comprising a liquid line 35, a reboiler heat exchanger 36, and a vapor return line 37. This reboiler circuit maintained the bottom of the regenerator columns 33 at a temperature of 240°F. and at a pressure of 12 psig. A net hydrogen sulfide stream, therefore, was withdrawn from the top of the regenerator column 33 via line 34 at a rate of 453.05 mols./hr. This hydrogen sulfide stream comprised predominately pure hydrogen sulfide vapor containing a trace of low boiling hydrocarbon constituents and a trace of water vapor, and it was passed into a sulfur recovery system, not shown.

A resulting aqueous lean MEA solution was withdrawn from the bottom of regenerator columns 33 via line 38 at a rate of 23,933.89 mols./hr. and at a temperature of 240°F. This total lean MEA solution comprised 20 wt. % MEA in water and contained 85.16 mols./hr. of chemically combined hydrogen sulfide, since the absorbent regenerator columns 33 was operated under conditions sufficient to strip out the greater portion of the hydrogen sulfide, but not all of the hydrogen sulfide contained in the rich absorbent liquid. Upon subsequent cooling in a heat exchanger, not shown, to a temperature of 100°F., the total MEA solution was passed via line 38 to a point at which the third lean MEA solution was withdrawn via line 39 at a rate of 118.93 mols./hr. The third MEA solution of line 39 was then passed into the top of the low pressure absorption zone 30 within the flash absorber column 28 for processing in the manner which was noted hereinabove. The remaining portion of the lean MEA solution continued to flow along line 38 to a point at which the second lean MEA solution was withdrawn at a rate of 9,525.99 mols./hr. for passage via line 40 into line 25 in order to provide the low pressure liquid-liquid contacting step which was discussed hereinabove. The balance of the lean MEA solution thereafter continued to flow in line 38 and was passed into the high pressure absorber column 20, wherein the lean MEA solution contacted the hydrogen-rich vapor in the high pressure absorption zone 21 in the manner which was disclosed hereinabove.

PREFERRED EMBODIMENTS

The effectiveness of the present invention will now be readily apparent to those skilled in the art in light of the foregoing disclosed example.

In particular, it is to be noted that in the example given, less than 60 percent of the lean absorbent utilized for hydrogen sulfide removal and recovery was passed into the high pressure absorber 20. This then resulted in an economic saving due to reduced pumping expense and due to reduced capital expense. Since the high pressure absorber vessel was greatly reduced in diameter and vessel wall thickness by reducing the liquid loading therein, the inventive process provided a high pressure absorber vessel which cost considerably less than what would have been required if a conventional gas treating system had been used, and the added cost of the low pressure contacting system did not greatly diminish this saving.

It must be realized that the example given is merely one preferred embodiment of the present invention and that the inventive process is not specifically limited to the embodiment which has been disclosed. For instance, although the preferred application of the present invention is in the removal of an acid gas or a mixture of acid gases from a high pressure vapor stream utilizing aqueous monoethanolamine solution as the absorbent, other amine solutions could be utilized such as diethanolamine, digylcolamine, and aminodiisopropanol. Moreover, other non-amine absorbent solutions could be utilized under the process of the present invention for the removal of acid gases from a high pressure vapor stream, or for the removal of any selected vapor constituent from the high pressure vapor stream, either by physical absorption in the liquid phase or by the chemical reaction occurring between the selected constituent and the active absorbent chemical.

The operating conditions which have been disclosed hereinabove are also specific to the example given and should not be used in limitation of the present invention. In particular, the present invention will find application where the high pressure system is in excess of 1,000 psig. and, preferably, the inventive process will find the greatest advantage where the high pressure system is maintained at a pressure in excess of about 1,500 psig. It is to be noted that in the specific example, hydrogen sulfide was removed from the vapor stream by utilizing a monoethanolamine solution. Since the absorption occurs not only due to physical retention of vapor in the liquid phase, but more particularly by the chemical reaction between the hydrogen sulfide and the amine, it is necessary to limit the maximum absorption temperature allowed within the high pressure absorption zone 21. Broadly, the maximum temperature within the high pressure absorption zone 21 should be maintained below 200°F. in order to provide that the temperature will not cause a reversal of the chemical reaction, thereby driving the hydrogen sulfide back out of the liquid solution and into the vapor state. In addition, the temperature should be maintained as low as possible in order to minimize the degree of corrosion which may otherwise occur within the high pressure absorber vessel 20. Although about 60 percent of the lean absorbent solution was passed into the high pressure absorber in the foregoing example, it is within the scope of the present invention to pass from about 30 percent to about 70 percent of the lean absorbent into the high pressure system, the amount being dependent upon the actual pressure and temperature of the system.

Those skilled in the art are well able to judiciously select the specific operating conditions which are necessary for any given operation for the removal of any selected constituent or plurality of constituents, whether an acid gas or other chemical or a mixture of chemicals, by utilizing the teachings which have been disclosed hereinabove.

In the example presented hereinabove and in the illustrative disclosure of the drawing, inline mixer 26 provided a liquid-liquid contacting zone of high turbulence wherein the second portion of lean absorbent solution of line 40 thoroughly contacted the flashed rich absorbent and the flash vapor which was discharged into line 25 from valve 24. Those skilled in the art will realize that the use of inline mixer 26 is not critical to the liquid-liquid contacting zone, since high turbulence for fluid mixing could be provided by other devices such as by the use of one or more mixing orifices. Similarly, the pressure drop within line 25 will often be sufficient to provide a region of high turbulence, so that the lean absorbent of line 40 may be thoroughly mixed in line 25 with the fluid discharged through valve 24 without the use of any specific mixing device.

These and other modifications to the inventive process will be readily apparent to those skilled in the art, and should in no way be construed to detract from the broadness of the present invention.

In light of the foregoing example, it may now be summarized that one preferred embodiment of the present invention resides in an improvement in a hydrogenation process wherein a hydrocarbon charge stock containing organic sulfur compounds is reacted in a high pressure reaction zone with a stoichiometric excess of hydrogen under desulfurization conditions including the presence of a hydrogenation catalyst selective for desulfurizing organic sulfur compounds, a resulting reaction zone effluent is separated into a hydrocarbon liquid phase and into a hydrogen-rich vapor phase containing hydrogen sulfide, and said hydrogen-rich vapor phase is returned at least in part to said reaction zone, which improvement comprises: (a) at least a portion of said hydrogen-rich vapor phase in a high pressure absorption zone, with a hereinafter specified first stream of lean absorbent selective for hydrogen sulfide; (b) removing from said absorption zone, a hydrogen-rich vapor stream having reduced concentration of hydrogen sulfide; (c) withdrawing from said absorption zone, a first rich absorbent containing hydrogen sulfide; (d) mixing said first rich absorbent with a hereinafter specified second stream of said lean absorbent in a low pressure contacting zone under conditions sufficient to provide a reduced mole ratio of hydrogen sulfide to absorbent in the resulting second rich absorbent; (e) passing said second rich absorbent into a separation zone maintained under conditions sufficient to provide a stream comprising hydrogen sulfide and a stream comprising separated lean absorbent; (f) passing a first portion of separated lean absorbent into said high pressure absorption zone as said specified first stream of lean absorbent; (g) passing a second portion of said separated lean absorbent into said low pressure contacting zone as said specified second stream of lean absorbent; and, (h) passing from said high pressure absorption zone into said high pressure reaction zone, said hydrogen-rich vapor stream having reduced concentration of hydrogen sulfide.

The invention claimed:

1. Process for removal of selected constituent from a first vapor stream containing said selected constituent, which comprises:
   a. contacting said first vapor stream in a high pressure absorption zone, with a hereinafter specified first stream of lean absorbent selective for said selected constituent;
   b. removing from said absorption zone, a second vapor comprising first vapor having reduced concentration of selected constituent;
   c. withdrawing from said absorption zone, a first rich absorbent containing selected constituent;
   d. mixing said first rich absorbent with a hereinafter specified second stream of said lean absorbent, in a low pressure liquid-liquid contacting zone of high turbulence under conditions sufficient to provide a reduced mole ratio of selected constituent to absorbent in a resulting second rich absorbent stream;
   e. passing said resulting second rich absorbent from said contacting zone into a separation zone which includes a low pressure absorption zone, said separation zone maintained under conditions sufficient to provide a stream comprising selected constituent and a stream comprising separated lean absorbent;
   f. passing a first portion of said separated lean absorbent into said high pressure absorption zone as said specified first stream of lean absorbent; and,
   g. passing a second portion of said separated lean absorbent into said low pressure contacting zone as said specified second stream of lean absorbent.

2. Process of claim 1 wherein said separation zone comprises a phase separator and said low pressure absorption zone, said second rich absorbent stream is passed into said phase separator under conditions sufficient to provide a third vapor stream and a third rich absorbent, said third vapor stream is contacted in said low pressure absorption zone with a third portion of separated lean absorbent under conditions sufficient to provide a fourth rich absorbent and a fourth vapor stream having substantial freedom from selected constituent, and said third rich absorbent and said fourth rich absorbent are separated under conditions sufficient to provide said separated lean absorbent.

3. Process of claim 1 wherein the ratio of said first portion of separated lean absorbent to said second portion of separated lean absorbent is in the range of from about 7:3 to about 3:7.

4. Process of claim 1 wherein said high pressure absorption zone is maintained at a pressure of at least 1,000 psig.

5. Process of claim 4 wherein said selected constituent comprises an acid gas selected from the group consisting of hydrogen sulfide, carbon dioxide, and carbonyl sulfide.

6. Process of claim 5 wherein said lean absorbent comprises an amine absorbent selective for said acid gas, said amine absorbent selected from the group consisting of monoethanolamine, diethanolamine, diglycolamine, and aminodiisopropanol.

7. Process of claim 6 wherein said high pressure absorption zone is maintained at a temperature below 200°F.

8. In a hydrogenation process wherein a hydrocarbon charge stock containing organic sulfur compounds is reacted in a high pressure reaction zone with a stoichiometric excess of hydrogen under desulfurization conditions including the presence of a hydrogenation catalyst selective for desulfurizing organic sulfur compounds, a resulting reaction zone effluent is separated into a hydrocarbon liquid phase and into a hydrogen-rich vapor phase containing hydrogen sulfide, and said hydrogen-rich vapor phase is returned at least in part to said reaction zone, the improvement which comprises:
  a. contacting at least a portion of said hydrogen-rich vapor phase in a high pressure absorption zone, with a hereinafter specified first stream of lean absorbent selective for hydrogen sulfide;
  b. removing from said absorption zone, a hydrogen-rich vapor stream having reduced concentration of hydrogen sulfide;
  c. withdrawing from said absorption zone, a first rich absorbent containing hydrogen sulfide;
  d. mixing said first rich absorbent with a hereinafter specified second stream of said lean absorbent in a low pressure liquid-liquid contacting zone of high turbulence under conditions sufficient to provide a reduced mole ratio of hydrogen sulfide to absorbent in a resulting second rich absorbent;
  e. passing said resulting second rich absorbent from said contacting zone into a separation zone which includes a low pressure absorption zone, said separation zone maintained under conditions sufficient to provide a stream comprising hydrogen sulfide and a stream comprising separated lean absorbent;
  f. passing a first portion of separated lean absorbent into said high pressure absorption zone as said specified first stream of lean absorbent;
  g. passing a second portion of said separated lean absorbent into said low pressure contacting zone as said specified second stream of lean absorbent; and,
  h. passing from said high pressure absorption zone into said high pressure reaction zone, said hydrogen-rich vapor stream having reduced concentration of hydrogen sulfide.

9. Process of claim 8 wherein said high pressure reaction zone and said high pressure absorption zone are maintained at a pressure in excess of 1000 psig.

10. Process of claim 8 wherein said lean absorbent comprises an organic amine compound selective for hydrogen sulfide, said organic amine compound selected from the group consisting of monethanolamine, diethanolamine, diglycolamine, and aminodiisopropanol.

11. Process of claim 8 wherein said separation zone comprises a phase separator and said low pressure absorption zone, said second rich absorbent is passed into said phase separator under conditions sufficient to provide a separated vapor stream and a third rich absorbent, said separated vapor stream is contacted in said low pressure absorption zone with a third portion of separated lean absorbent under conditions sufficient to provide a fourth rich absorbent and a contacted vapor stream having substantial freedom from hydrogen sulfide, and said third rich absorbent and said fourth rich absorbent are separated under conditions sufficient to provide said separated lean absorbent.

12. Process of claim 8 wherein the ratio of said first portion of separated lean absorbent to said second portion of separated lean absorbent is in the range of from about 7:3 to about 3:7.

* * * * *